(12) United States Patent
Fujii et al.

(10) Patent No.: US 7,351,183 B2
(45) Date of Patent: Apr. 1, 2008

(54) RATIO SHIFT CONTROL FOR A MULTIPLE RATIO AUTOMATIC TRANSMISSION

(75) Inventors: Yuji Fujii, Ann Arbor, MI (US); Marvin Paul Kraska, Dearborn, MI (US); Gregory Michael Pietron, Canton, MI (US); William Emil Tobler, Willis, MI (US); Walter Joseph Ortmann, Saline, MI (US); Bradley Dean Riedle, Northville, MI (US); Ronald Thomas Cowan, Rochester Hills, MI (US); Davorin David Hrovat, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 235 days.

(21) Appl. No.: 10/905,123

(22) Filed: Dec. 16, 2004

(65) Prior Publication Data

US 2006/0135316 A1 Jun. 22, 2006

(51) Int. Cl.
*B60W 10/04* (2006.01)
*F16H 61/04* (2006.01)
(52) U.S. Cl. ...................... 477/109; 477/143
(58) Field of Classification Search ............. 477/107, 477/109, 143, 156, 127, 128
See application file for complete search history.

(56) References Cited

U.S. PATENT DOCUMENTS

| 4,653,350 | A | 3/1987 | Downs et al. |
| 4,707,789 | A | 11/1987 | Downs et al. |
| 4,724,723 | A | 2/1988 | Lockhart et al. |
| 5,129,286 | A | 7/1992 | Nitz et al. |
| 5,407,401 | A | 4/1995 | Bullmer et al. |
| 5,658,217 | A | 8/1997 | Tsukada |
| 5,935,185 | A | 8/1999 | Sawamura et al. |
| 5,938,712 | A | 8/1999 | Ibamoto et al. |
| 5,944,765 | A | 8/1999 | Saito et al. |
| 5,976,054 | A | 11/1999 | Yasuoka |
| 6,364,811 | B1 | 4/2002 | Hubbard et al. |
| 6,656,087 | B1* | 12/2003 | Runde et al. .......... 477/107 |
| 2002/0025885 | A1* | 2/2002 | Saito et al. .......... 477/143 |

\* cited by examiner

*Primary Examiner*—Roger Pang
(74) *Attorney, Agent, or Firm*—David B. Kelly; Brooks Kushman P.C.

(57) ABSTRACT

A gear ratio shift control and control method controls gear ratio upshifts in a multiple-ratio transmission for an automotive vehicle. Pressure actuated friction elements establish torque flow paths in transmission gearing as they are selectively engaged and released. A net torque reduction at a transmission torque output shaft during an upshift event is reduced by increasing transmission input torque prior to the start of the inertia phase of the upshift event.

13 Claims, 10 Drawing Sheets

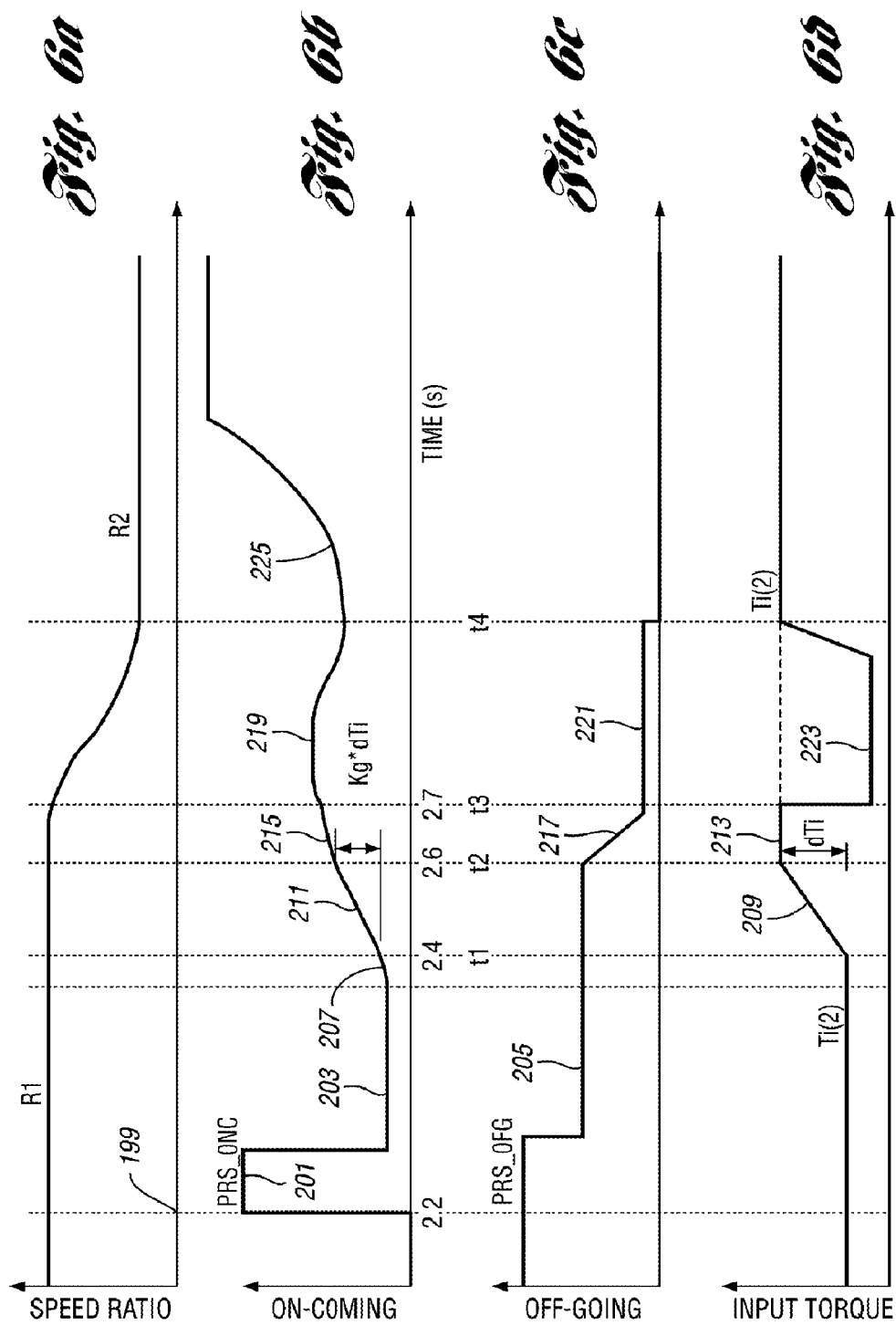

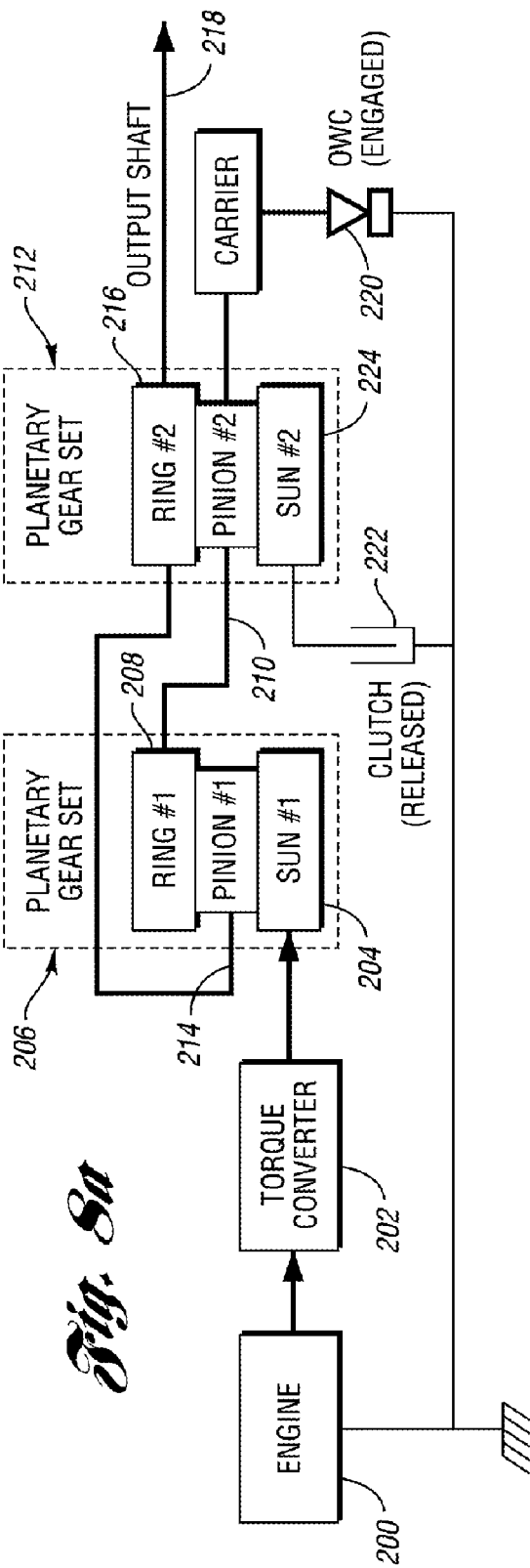
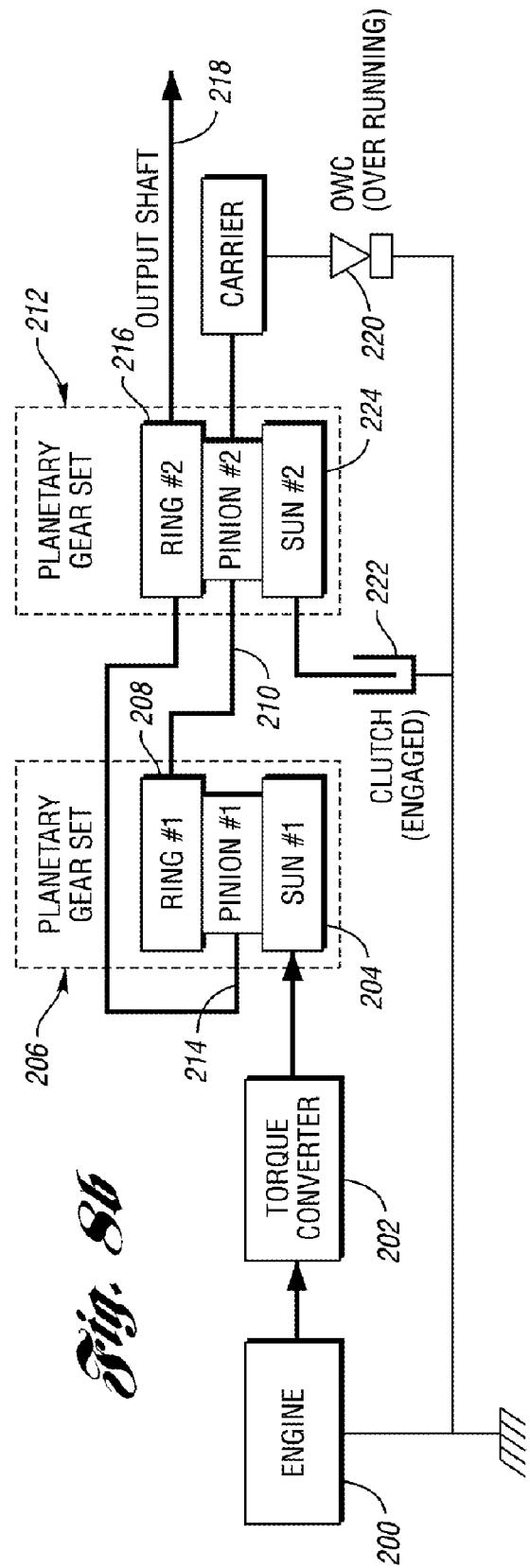
Fig. 8a
Fig. 8b

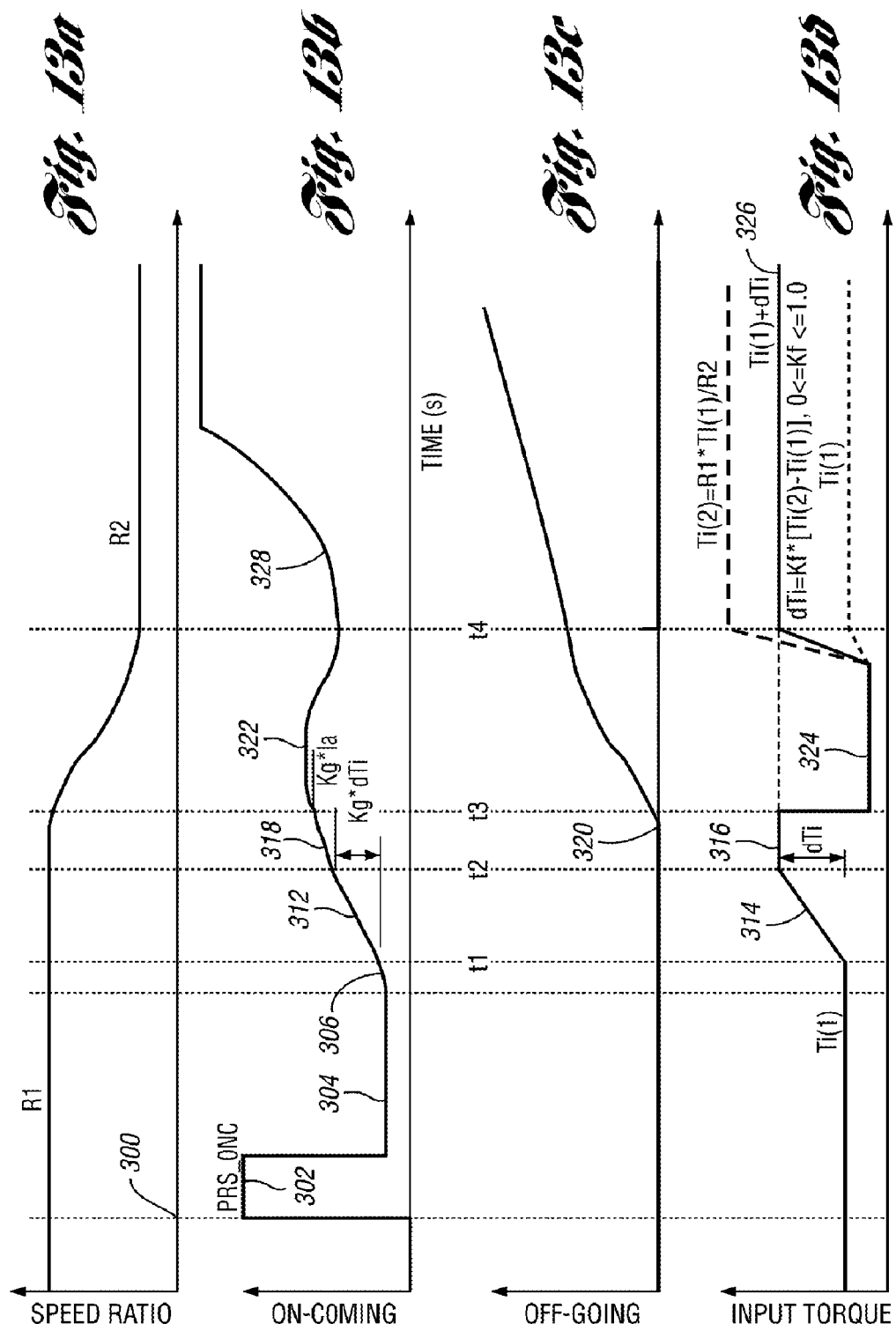

RATIO SHIFT CONTROL FOR A MULTIPLE RATIO AUTOMATIC TRANSMISSION

BACKGROUND OF THE INVENTION

1. Field of the Invention

The invention relates to multiple ratio geared transmissions for use in an automotive vehicle powertrain and to a control strategy for effecting engagement and release of transmission friction torque establishing elements during a ratio change.

2. Background Art

Ratio changes in a geared automatic transmission in an automotive vehicle powertrain are achieved by engaging a so-called on-coming clutch as a so-called off-going clutch is released. The clutches, which may be referred to as transmission friction elements or brakes, establish and disestablish power flow paths from an internal combustion engine to vehicle traction wheels. During acceleration of the vehicle, the overall speed ratio, which is the ratio of transmission input shaft speed to output shaft speed, is reduced as vehicle speed increases for a given engine throttle setting. This is a ratio upshift. A downshift to achieve a higher speed ratio occurs as the engine throttle setting increases for any given vehicle speed, or when the vehicle speed decreases as the engine throttle setting is relaxed. This is a power-on downshift, or a coasting downshift, respectively.

For purposes of the present disclosure, an upshift or high gear configuration of the transmission with power on will be described as having a high or a higher speed ratio (transmission output speed/transmission input speed) during acceleration of the vehicle. Further, a downshift or low gear configuration of the transmission with power on will be described as having a low or a lower speed ratio during acceleration of the vehicle.

In the case of a synchronous upshift, the on-coming clutch engages to lower both speed ratio and torque ratio, the latter being the ratio of output torque to input torque. The upshift event can be divided into three phases, which may be referred to as a preparatory phase, a torque phase and an inertia phase. For the synchronous upshift, the torque phase is hereafter defined as a time period when the off-going clutch torque is purposely controlled to decrease toward a value of zero or a non-significant level with an intention to disengage it. Simultaneously, during the torque phase, the on-coming clutch torque is purposely controlled to increase from a value of zero or a non-significant level, thereby initiating the on-coming clutch engagement according to a conventional upshift control. The timing of clutch engagement and disengagement results in a momentary simultaneous activation of two torque flow paths through the gearing, thereby causing torque delivery to drop momentarily at the automatic transmission output shaft. This condition, which can be referred to as a "torque hole," occurs before the off-going clutch disengages. A large torque hole can be perceived by a vehicle occupant as an unpleasant shift shock. The preparatory phase for the synchronous shift is hereafter defined as a time period prior to the torque phase. The inertia phase for the synchronous shift is hereafter defined as a time period when the off-going clutch starts to slip, following the torque phase.

In the case of a non-synchronous automatic transmission, the upshifting event involves engagement control of only an on-coming friction element, while a companion clutching component, typically a one-way coupling, automatically disengages to reduce both speed ratio and torque ratio. The non-synchronous upshift event can be divided into three phases, which may be referred to as a preparatory phase, a torque phase and an inertia phase. The torque phase for the non-synchronous shift is hereafter defined as a time period when the on-coming clutch torque is purposely raised for its engagement until the one-way coupling starts slipping or overrunning. This definition differs from that for the synchronous shift because the non-synchronous shift does not involve active control of the one-way coupling or the off-going friction element. According to a conventional upshift control, during the torque phase of the upshifting event for a non-synchronous automatic transmission, the torque transmitted through the oncoming clutch increases as it begins to engage. A kinematic structure of a non-synchronous upshift automatic transmission is designed in such a way that torque transmitted through the one-way coupling automatically decreases in response to increasing oncoming clutch torque. As a result of this interaction, the automatic transmission output shaft torque drops during the torque phase, which again creates a so-called "torque hole." Before the one-way coupling disengages, as in the case previously described, a large torque hole can be perceived by a vehicle occupant as an unpleasant shift shock. The preparatory phase for the non-synchronous upshift is hereafter defined as a time period prior to the torque phase. The inertia phase for the non-synchronous upshift is hereafter defined as a time period when the one-way coupling starts to slip, following the torque phase.

U.S. Pat. No. 4,724,723 discloses one method for eliminating a so-called "torque hole." That method assumes, however, that output shaft torque can be measured and used in executing a control algorithm. In the case of the design of the '723 patent, engine throttle position is increased during a preparatory phase of the non-synchronous shift event. Simultaneously, engine spark timing is retarded based on an output torque measurement, which cancels the effects of the throttle change and maintains constant engine torque. The on-coming friction element torque remains zero during the preparatory phase, unlike the control of the present invention, as will be explained. During the torque phase of the system of the '723 patent, spark timing is restored to increase engine torque. This engine torque increase, again, is based on output torque measurements while the on-coming friction element torque starts increasing from zero value or a non-significant level and the off-going friction element torque is reduced toward zero value or a non-significant level during the torque phase.

The inertia phase of the control system of the '723 patent begins when the off-going friction element starts to slip, following the torque phase. During the inertia phase, the engine throttle position and engine spark timing are controlled to reduce engine torque. During shifting, the output shaft torque remains relatively constant.

Thus, according to the '723 patent, engine spark timing control, which is based on measured transmission output shaft torque, is actively used to maintain a constant engine torque during the preparatory stage while the engine throttle increases. Then it relies upon engine spark timing control based on output shaft torque measurements during the torque phase to raise engine torque.

SUMMARY OF THE INVENTION

Unlike prior art solutions to the problem of eliminating a torque hole during a synchronous upshift event, the method of the invention purposely raises engine torque during a preparatory phase by changing engine throttle position. The effects of the increased engine torque is mitigated by means of increased on-coming clutch torque during the preparatory phase. The off-going clutch is securely engaged although its torque capacity may be reduced during the preparatory phase. Thus, the increased on-coming clutch torque produces momentary gearing tie-up with the off-going clutch due to the simultaneous establishment of two torque flow paths, but the effects of the tie-up are overcome because the engine torque is increasing at the beginning of an upshift event.

The present invention is simpler than prior art systems because it comprises an open-loop-based shift control method without requiring transmission output shaft torque measurements. It also does not require engine spark timing control during the preparatory phase and during the torque phase. The invention also makes it possible to reduce the torque phase time, since the on-coming clutch torque is raised to a calibrated level prior to the torque phase. The invention eliminates, or significantly reduces, the torque hole during a synchronous upshift of a multiple ratio transmission in a vehicle powertrain with electronic engine throttle control for controlling throttle position. The invention can be also applied to a broad range of powertrain systems that provide increased torque input for a step ratio automatic transmission system during a preparatory stage of a synchronous upshift event for conventional powertrains, as well as pre-transmission hybrid electric vehicle powertrains, such as the hybrid electric vehicle powertrain disclosed in U.S. patent application Ser. No. 10/605,313, filed Sep. 22, 2003, and titled "A Controller And Control Method For A Hybrid Electric Vehicle Powertrain," which is assigned to the assignee of the present invention.

Engine torque is increased, as previously explained, during the preparatory phase of a synchronous upshift. In the case of a hybrid electric vehicle, the input torque provided by the engine can be supplemented by motor torque during the preparatory phase of a synchronous upshift and the adverse effects of the increased torque during the preparatory phase is overcome by the simultaneous increase of the on-coming clutch capacity torque input.

The invention further eliminates or reduces output shaft torque oscillation during the inertia phase, which is triggered by a large torque hole in the case of a conventional upshift control, thus reducing undesirable shift shocks, which reduce driver comfort. Engine spark timing control during the preparatory phase and the torque phase is not necessary in the implementation of the synchronous upshift strategy of the invention. Further, the invention makes possible a quick release of the off-going friction clutch, thereby shortening the torque phase. This is due to the increased level of torque into the automatic transmission system and to an increased on-coming clutch torque prior to the torque phase.

The use of simultaneously increased engine torque and on-coming clutch torque prior to the inertia phase of a shift event is common to both synchronous upshifts and non-synchronous upshifts. In the case of a synchronous upshift, the invention includes an open-loop based approach to achieve an increased engine torque during the preparatory phase in a transmission using electronic engine throttle control. In the case of a non-synchronous upshift, the invention includes an open-loop based approach to achieve an increased engine torque during the torque phase in a transmission using electronic engine throttle control.

The invention does not require the use of output shaft torque measurements, regardless of whether the transmission is synchronous or non-synchronous. In the case of the synchronous shift, an increase in the on-coming clutch engagement torque occurs simultaneously with an increase in the input torque into the automatic transmission system during the preparatory phase. In the case of the non-synchronous shift, an increase in the on-coming clutch engagement torque occurs simultaneously with an increase in the input torque into the automatic transmission system during the torque phase, which is previously defined differently from that for the synchronous shift. The on-coming clutch engagement torque control is based on speed measurements, including engine speed, automatic transmission input shaft speed and automatic transmission output shaft speed for both synchronous and non-synchronous transmissions.

In the execution of the synchronous ratio shift control and control method of the invention, the torque capacity of the off-going torque establishing element (e.g., the low ratio clutch) is maintained at a level that does not slip the off-going clutch during the preparatory phase and released or decreased during the torque phase. The torque capacity of the on-coming torque establishing element (e.g., the high ratio clutch) is increased during the preparatory phase and the torque phase. The input torque into the synchronous transmission system is increased during the preparatory phase. The input torque increase is followed by an inertia phase, when the input torque is reduced by an engine spark timing control in order to complete on-coming clutch engagement without requiring excessive on-coming clutch torque capacity.

The synchronous upshift may be completed following the inertia phase by increasing input torque in the upshifted gear configuration.

The torque capacity of the torque establishing element for the second gear configuration or on-coming clutch of a non-synchronous transmission is increased as input torque is increased during the torque phase. Overrunning clutch torque is automatically decreased during the torque phase in response to increasing on-coming clutch torque.

BRIEF DESCRIPTION OF THE DRAWINGS

FIG. 1a is a schematic illustration of a synchronous multiple-ratio transmission in high gear configuration;

FIGS. 6a, 6b, 6c and 6d are time plots for an embodiment of the invention with a synchronous transmission showing, respectively, speed ratio, on-coming clutch pressure, off-going clutch pressure and transmission input torque;

FIG. 8a is a schematic representation of a multiple ratio non-synchronous transmission in the low gear ratio configuration;

FIG. 8b is a schematic representation of a non-synchronous transmission in an upshift configuration;

FIGS. 13a, 13b, 13c and 13d show, respectively, the speed ratio, the on-coming clutch pressure, the off-going clutch slip and the input torque for an embodiment of the invention with a non-synchronous transmission.

DETAILED DESCRIPTION OF EMBODIMENTS OF THE INVENTION

Figure 1:
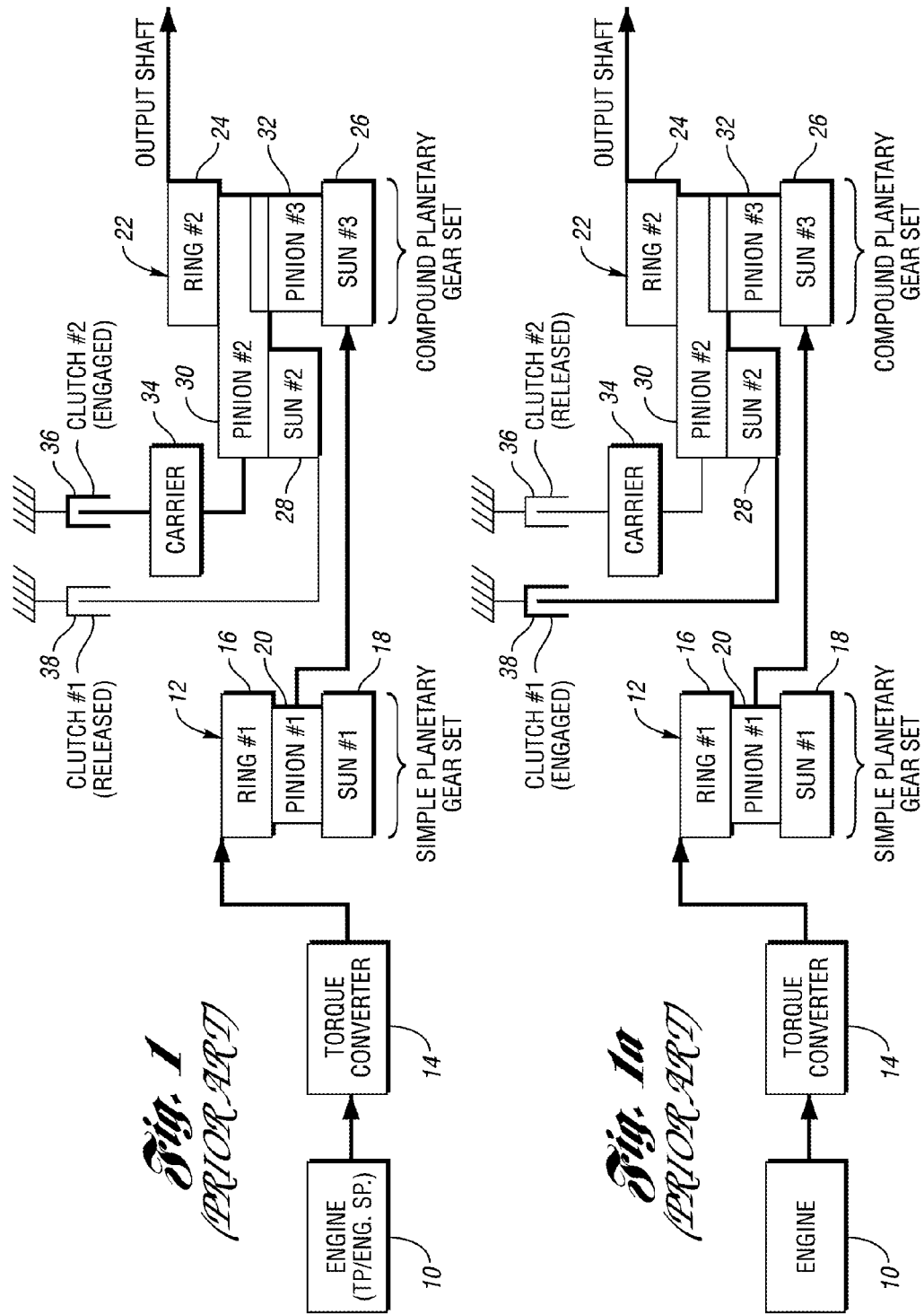
FIG. 1 is a schematic representation of a synchronous multiple-ratio automatic transmission in a low gear configuration.

FIGS. 1 and 1a show an example of a multiple ratio geared transmission in an automotive vehicle powertrain. Although the powertrain shown in FIG. 1 includes a torque converter at the torque input side of the transmission, the present invention could be used as well in a hybrid powertrain that includes, for example, an engine and an electric motor without a torque converter. In a hybrid configuration, the power of the engine is complemented by the power generated electrically by the motor. Further, the specific gearing arrangement illustrated in FIG. 1 could be replaced by other gearing arrangements that establish multiple torque flow paths from a power source to a torque output shaft.

In the configuration of FIG. 1, an internal combustion engine is shown at 10. The torque output side of the engine is hydrokinetically coupled to a simple planetary gear set 12 of a multiple ratio transmission mechanism by a hydrokinetic torque converter 14. Torque is delivered by a torque converter turbine to ring gear 16 of the simple planetary gear set 12. Sun gear 18 acts as a reaction element as torque is delivered by a planetary carrier for pinions 20, which engage ring gear 16 and sun gear 18.

A compound planetary gear set 22 comprises a ring gear 24, which is driveably connected to a power output shaft. Sun gear 26 acts as a torque input element for the gear set 22. A second sun gear 28 engages long planet pinions 30, which in turn engage ring gear 24 and short pinions 32. Sun gear 26 also engages pinions 32.

The pinions form a compound pinion assembly supported on carrier 34, which can be selectively braked by brake 36. Brake 36 is identified in FIG. 1 as clutch #2. Sun gear 28 can be selectively braked by friction brake 38, which is identified in FIG. 1 as clutch #1.

FIG. 1 shows a low gear configuration with friction element 36 acting as a reaction point for the compound planetary gear set. The torque flow path in the powertrain is indicated in FIG. 1 by heavy directional lines. Torque is delivered during low gear operation from the simple planetary gear set 12 to the sun gear 26 of the compound planetary gear set 22. Ring gear 24 delivers driving torque to the output shaft.

During a synchronous upshift from the low gear configuration of FIG. 1 to the high gear configuration of FIG. 1a, friction element 36 is released and friction element 38 is applied. At this time, sun gear 28 is braked by friction element 38. It functions as a reaction point for the compound planetary gear set 22. During this upshift from a low gear configuration to a higher gear configuration, both the speed ratio and the torque ratio become lower.

For purposes of this description, the speed ratio is defined as the input shaft speed divided by output shaft speed. Further, torque ratio, for purposes of this description, is defined as transmission output shaft torque divided by input shaft torque.

Figure 2:
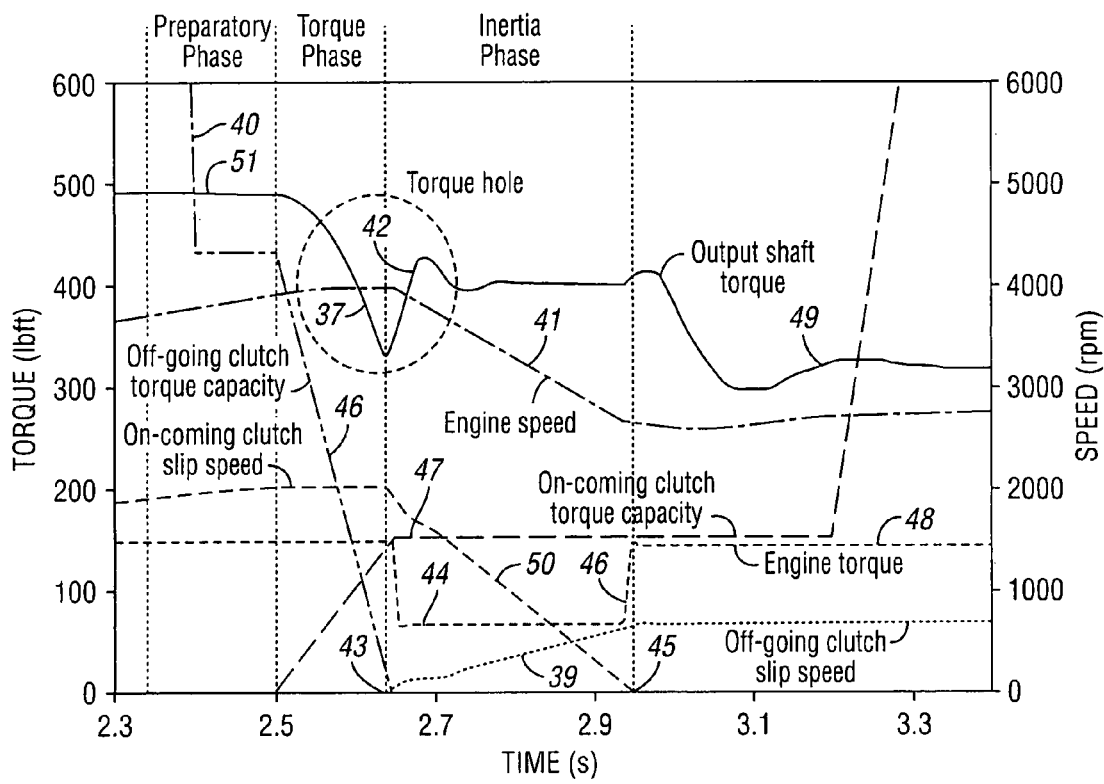
FIG. 2 is a plot of a conventional synchronous upshift control method in a powertrain with no electronic throttle control.

FIG. 2 shows a plot of a synchronous upshift event from the low gear configuration to the high gear configuration with a constant engine throttle setting. The variables plotted in FIG. 2 are characteristic of a conventional synchronous upshift control method. Vehicle speed can be considered approximately constant during the shift due to its short duration.

The synchronous upshift event of FIG. 2 is divided into three phases: the preparatory phase, the torque phase and the inertia phase. The torque phase for the synchronous shift is defined as a time period when torque capacity of the off-going clutch 36 is purposely controlled to decrease toward a value of zero for its engagement. The preparatory phase for the synchronous shift is defined as a time period prior to the torque phase. The inertia phase for the synchronous shift is defined as a time period when the off-going clutch 36 starts to slip, following the torque phase. During the preparatory phase, the torque capacity of friction element 36 is reduced, as shown at 40, to prepare for its release. Clutch 36 maintains enough torque capacity, however, to keep it from slipping at this time. The stroking of clutch 38, which is the oncoming clutch, takes place to prepare for its engagement. During the torque phase, the capacity of the off-going clutch 36 is further reduced toward zero with an intention to disengage it, as shown at 46 in FIG. 2, while the on-coming clutch torque capacity is raised to level 47, as shown at 39. During the torque phase, the off-going clutch 36 is still engaged without slipping, thereby maintaining the planetary gear set in the low gear configuration. The increasing torque capacity of the on-coming clutch 38, however, reduces the net torque flow within the gear set. The output shaft torque, therefore, drops significantly as shown at 37 during the torque phase. This creates a so-called "torque hole." A large torque hole, as mentioned previously, can be perceived by a vehicle occupant as an unpleasant shift shock.

The torque phase ends and the inertia phase begins when the off-going clutch 36 starts slipping, as shown at 43. The off-going clutch 36 may slip before its capacity reaches zero or non-significant level. During the inertia phase, the off-going clutch slip speed rises, as shown at 39 in FIG. 2, while the on-coming clutch slip speed decreases toward zero, as shown at 50 and 45 in FIG. 2. The engine speed drops, as shown at 41 in FIG. 2, as the planetary gear configuration changes. During the inertia phase, the output shaft torque is primarily affected by the capacity of the on-coming clutch 38. This causes the output torque to rapidly move to level 42, as seen in FIG. 2, which corresponds to the on-coming clutch torque 47 at the beginning of the inertia phase. Under certain conditions, this may lead to a large torque oscillation that can be perceptible to a vehicle occupant as an unpleasant shift shock as shown later.

FIG. 2 shows a reduced engine torque at 44 during the inertia phase. This is caused by engine torque truncation by means of engine spark timing retard, which is a common method for reducing engine torque during the inertia phase of shifting to enable the on-coming clutch 38 to engage within a target time without requiring excessive torque capacity. When the oncoming clutch 38 completes its engagement, or when its slip speed becomes zero, as shown at 45 in FIG. 2, the inertia phase ends. The engine torque truncation is removed, as shown at 46, and the output shaft torque moves to the level shown at 49, which corresponds to a given engine torque level shown at 48. The output torque level 49 is lower than the initial torque level 51 because of the ratio change in the gearing even though the engine torque level 48 is about the same before and after the shift.

Figure 3:
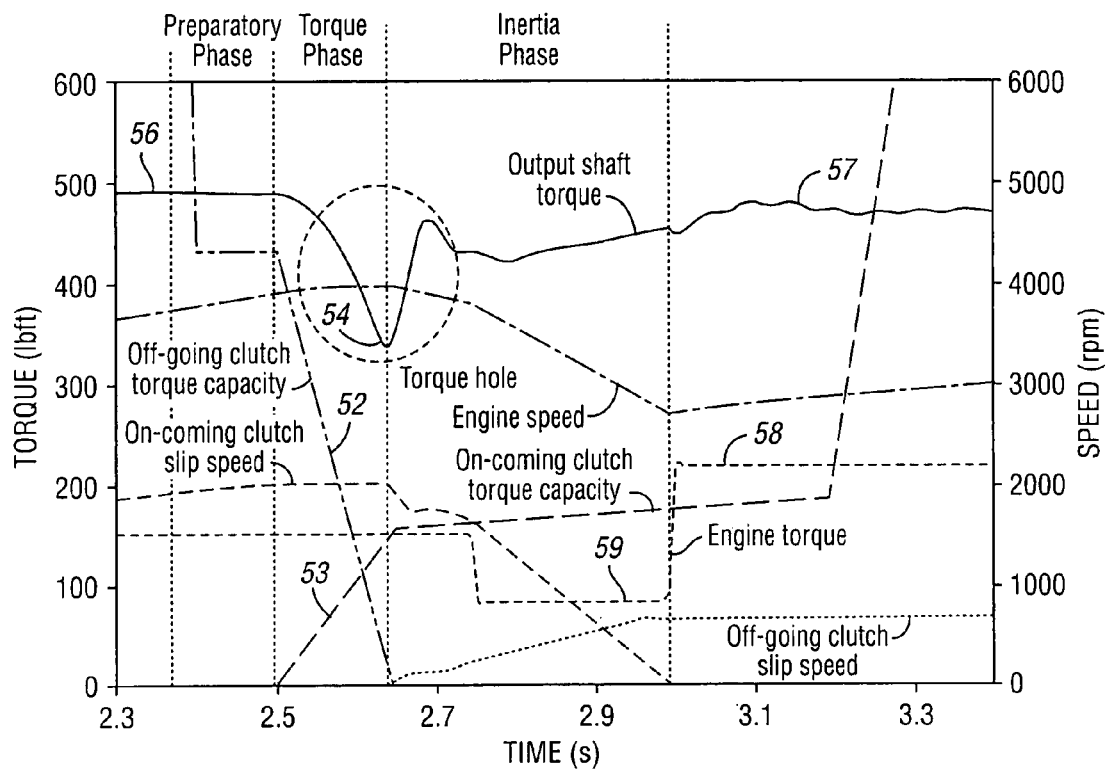
FIG. 3 is a plot of a conventional synchronous upshift control method for a powertrain with electronic throttle control.

FIG. 3 shows an example of a conventional synchronous upshift control method for a powertrain with electronic engine throttle control (ETC). During the torque phase, the off-going clutch torque capacity is purposely reduced toward zero, as shown at 52, with an intention to disengage it while the on-coming clutch torque capacity is increased, as shown at 53 in FIG. 3, thereby creating a torque hole shown at 54. The presence of a large torque hole, as indicated earlier, can be perceived by a vehicle occupant as an unpleasant shift shock. The engine throttle is increased during the inertia phase to achieve a level of output shaft torque at 56 that is somewhat the same as the output shaft torque after the shift at 57. Although throttle movement is not explicitly shown in FIG. 3, its effect is shown as an increased engine torque at 58 following the inertia phase. The engine torque is truncated, as shown at 59 in FIG. 3, throughout the inertia phase by means of an engine spark timing control.

Figure 4A:
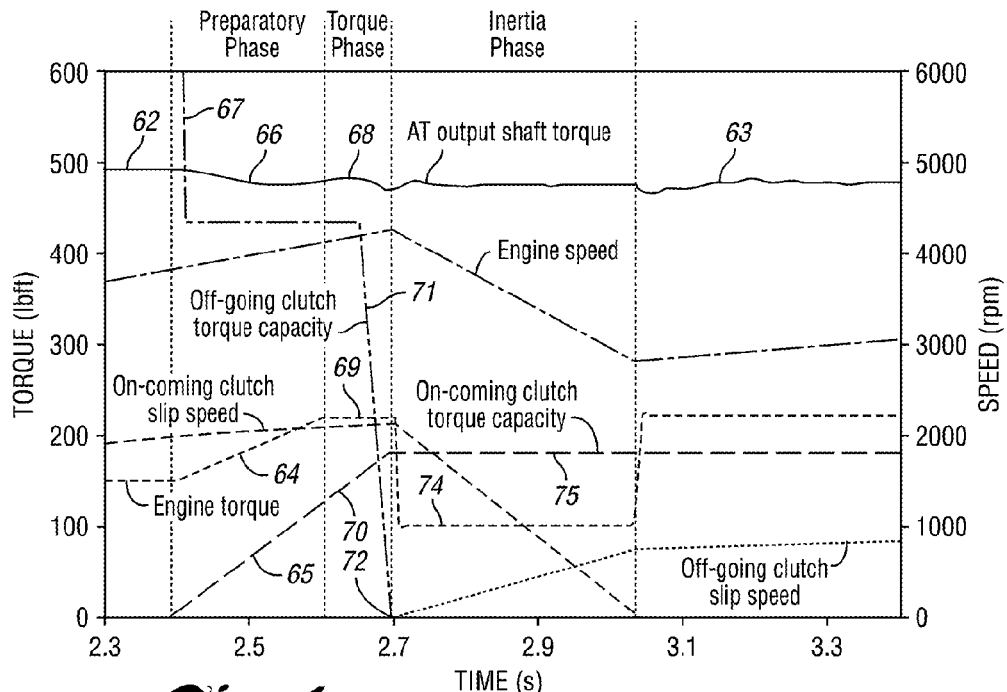
FIG. 4a is a plot of the synchronous control of the invention for an electronic throttle controlled powertrain.

FIG. 4*a* shows the synchronous upshift control of the present invention for a powertrain with electronic throttle control (ETC). During the preparatory phase, the engine throttle is increased, as shown in FIG. 4*a*. The engine throttle is increased to a target level to achieve approximately the same levels of output shaft torque before the shift at 62 and after the shift at 63. This target level may be adjusted if a different output shaft torque is desired after the shift in a particular vehicle application. FIG. 4*a* shows an increasing engine torque at 64 during the preparatory stage, which reflects the throttle change. No spark timing control is required during this phase, unlike the method described in the U.S. Pat. No. 4,724,723.

While the engine torque increases, as shown at 64, on-coming clutch torque capacity is raised, at shown at 65, to prevent abrupt change in engine speed and output shaft torque. That is, when the increase in engine torque is balanced with on-coming clutch torque, the output shaft torque stays relatively constant, as shown at 66. Both the engine torque and the on-coming clutch engagement torque are controlled based on an open-loop approach without requiring output shaft torque measurements in such a way that an unexpected deviation in speed signals is adaptively corrected for one shift to another based on speed measurements, including engine speed and transmission output shaft speed. The off-going clutch torque capacity is reduced during the preparatory phase, as shown at 67, to prepare for its release. Its torque capacity level, however, must be still large enough to securely maintain its engagement during the preparatory phase.

During the torque phase, engine throttle position may be kept constant, as shown at 69. No engine spark timing control is required, unlike the method disclosed in U.S. Pat. No. 4,724,723. The torque capacity of the on-coming clutch 38 is further increased, as shown at 70, to a target level for engagement. The increase in on-coming clutch torque, however, is not required if it has a target capacity prior to the torque phase. The off-going clutch torque capacity is reduced, as shown at 71, toward zero or non-significant level, as shown at 72, with an intention disengage it. When the off-going clutch starts slipping, as shown at 72, the torque phase ends and the inertia phase begins. Quick release of the off-going clutch is achieved for a shorter torque phase due to increased level of torque into the transmission system and increased on-coming clutch torque prior to the torque phase. There is no significant torque hole during the torque phase 68, in contrast to a conventional system, due to increased torque level into the transmission system, due to the small change in the on-coming clutch torque capacity during the torque phase, and due to the short torque phase time interval compared to the torque phase time interval of FIGS. 2 and 3.

During the inertia phase for the controller functions illustrated in FIG. 4*a*, as in the case of the conventional controller functions of FIGS. 2 and 3, there is an engine torque truncation, as shown at 74, and a closed-loop control of speed ratio using on-coming clutch torque, as shown at 75 in FIG. 4*a*.

Figure 4B:
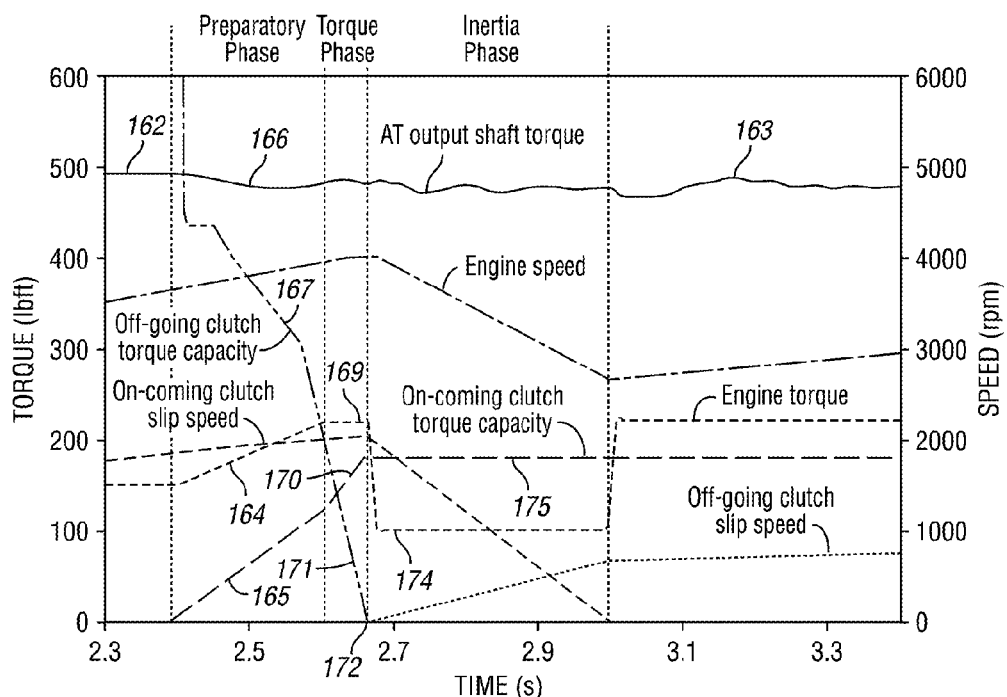
FIG. 4b is a plot of an alternate synchronous upshift control of the invention.

In the synchronous control method illustrated in FIGS. 4*a* and 4*b*, there is a controlled increase in torque into the automatic transmission system during the preparatory phase. If the powertrain is equipped with electronic throttle control, as indicated in FIG. 4*a*, the control method of the invention is applicable to shift conditions that permit engine torque to increase through additional throttle opening. If the powertrain is a hybrid electric powertrain with an electric motor, the electric motor can be used to supplement engine torque during the preparatory phase.

In FIG. 4*b*, which shows characteristics of a synchronous upshift of a step ratio transmission with electronic throttle control (ETC), the engine throttle is increased during the preparatory phase to a target level so that the output shaft torque prior to the shift at 162 in FIG. 4*b* approximately equals the output shaft torque 163 after the shift. This target level may be adjusted if a different output shaft torque is desired after the shift in a particular vehicle application. Shown also in FIG. 4*b* is an increasing engine torque at 164 during the preparatory phase. This is achieved by increasing engine throttle opening. No spark timing controllers are required during the preparatory phase. While the engine torque increases at 164, the on-coming clutch torque capacity is raised, as shown at 165, to prevent abrupt change in both engine speed and output shaft torque. When the increase in engine torque at 164 is balanced with the on-coming clutch torque at 165, the output shaft torque remains relatively flat, as shown at 166. Both the engine torque and the on-coming clutch engagement torque are controlled based on an open-loop approach without requiring output shaft torque measurements in such a way that an unexpected deviation in speed signals is adaptively corrected for one shift to another based on speed measurements, including engine speed and transmission output shaft speed.

During the preparatory phase in FIG. 4*b*, the off-going clutch torque capacity is ramped down as much as possible, as shown at 167, within a range that permits no slipping of the off-going clutch. This torque reduction may take any profile as long as the off-going clutch maintains its engagement. The reduced off-going clutch torque permits a quick release during the torque phase when its disengagement is purposely commanded. During the torque phase, the engine throttle position may be kept constant, as shown at 169. Again, no engine spark timing control is required. The torque capacity of the on-coming clutch is further increased, as shown at 170, to a target level 175 for engagement. An increase in the on-coming clutch torque, however, is not required if the clutch has reached a target capacity prior to the torque phase.

During the torque phase, the off-going clutch torque capacity is purposely and quickly reduced toward zero to disengage the off-going clutch, as shown at 171. When the off-going clutch starts slipping at 172, the torque phase ends and the inertia phase begins. The shorter torque phase is due to a quick release of the off-going clutch, an increased torque level into the transmission system, and an increased on-coming clutch torque prior to the torque phase.

There is no significant torque hole in the output shaft torque during the torque phase. This is due to the increased torque level into the transmission system, a quick and small change in the on-coming clutch torque capacity, and a quick release of the off-going clutch.

During the inertia phase, a conventional shift control may apply, including a conventional engine torque truncation, as shown at 174, and a closed-loop control of speed ratio using the on-coming clutch torque, as shown at 175. In the strategy of the present invention applied to the synchronous upshift, a control torque increase into the transmission system is achieved during the preparatory phase. In a powertrain equipped with electronic throttle control (ETC), the method is applicable to shift conditions that permit engine torque increases through additional throttle opening. In the alternative, if the powertrain is a hybrid electric powertrain where an electric motor supplements engine torque, the electric motor can be used to supplement engine torque during the preparatory phase.

Figure 5A:
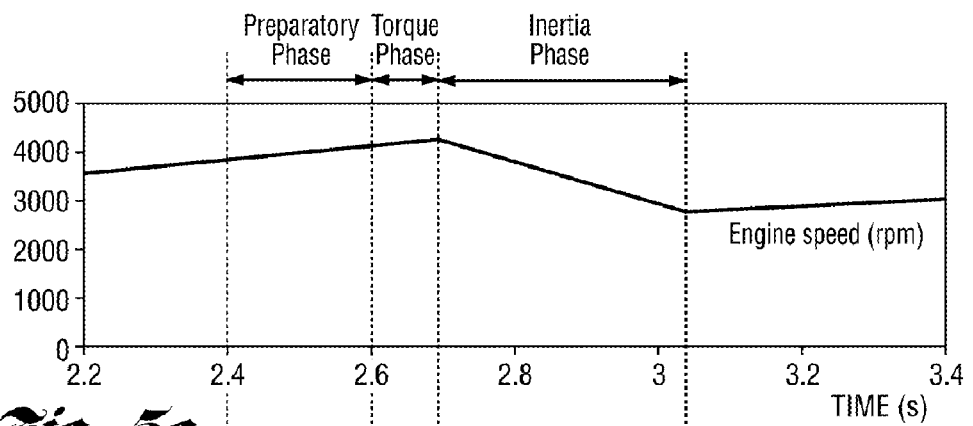
FIGS. 5a, 5b, 5c and 5d are time plots for the synchronous upshift control of the invention for a powertrain with electronic throttle control.
Figure 5B:
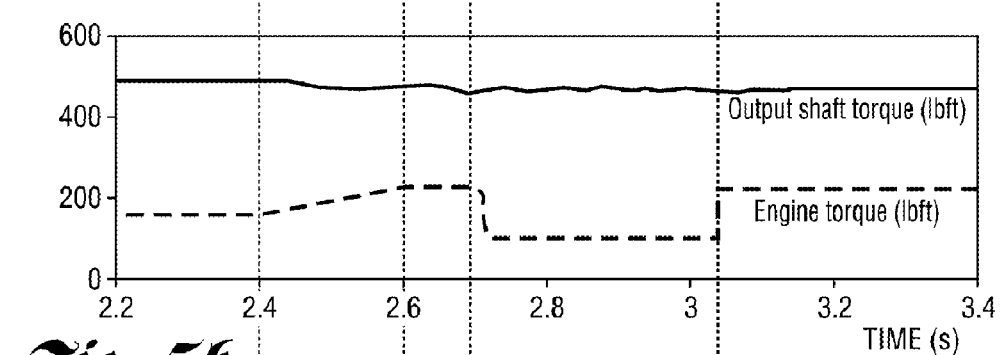
Figure 5C:
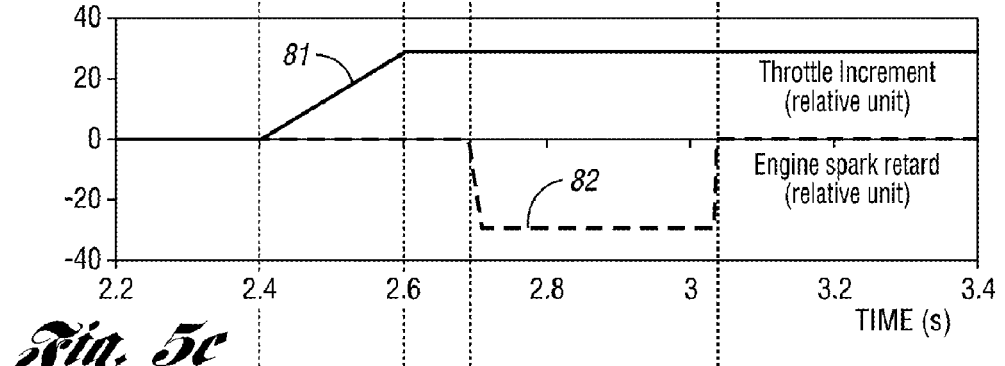
Figure 5D:
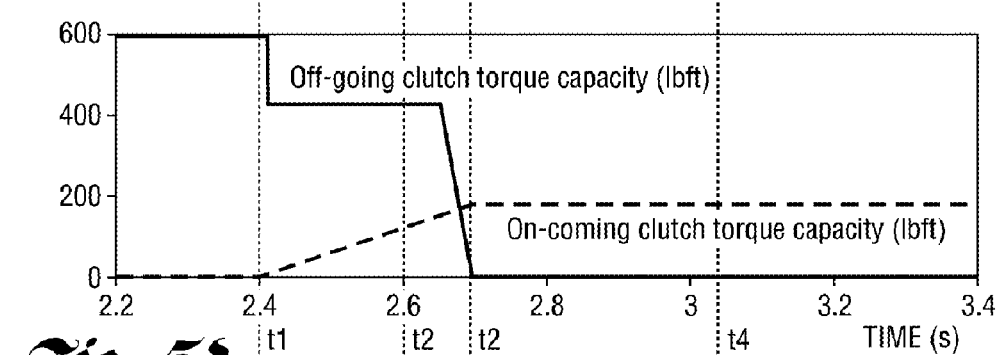

FIGS. 5a, 5b, 5c and 5d show the synchronous upshift control method of the invention with an electronic throttle controlled engine. The plot of engine speed in FIG. 5a is similar to the engine speed information of FIGS. 4a and 4b. Likewise, the output shaft torque and the engine torque plots of FIG. 5b are similar to the corresponding plots in FIGS. 4a and 4b. FIG. 5c shows the engine throttle position profile and the engine spark timing profile at 81 and 82, respectively. The accompanying change in off-going clutch torque capacity and in on-coming clutch torque capacity for the throttle and engine spark changes in FIG. 5c are illustrated in FIG. 5d.

FIGS. 6a, 6b, 6c and 6d summarize the entire shift control sequence of the invention applied to a synchronous upshift event. Prior to the preparatory phase, the on-coming and off-going friction elements must be staged in timed relationship with respect to the input torque change that is characteristic of the present invention. As soon as the automatic upshift from speed ratio R1 to R2, as seen in FIG. 6a, is commanded at 199, the on-coming friction element pressure command is raised to level 201, seen in FIG. 6b, to speed the filling of the clutch piston. The on-coming pressure is reduced from the level at 201 to approximately its stroke value at 203. The on-coming friction element thus fills and completes its stroke without gaining any significant torque capacity. Concurrently, the off-going friction element pressure command is reduced to a value 205, as seen in FIG. 6c, which is sufficient to hold the off-going friction element against combustion torque in the upshifted gear seen at 213 at FIG. 6d.

After the stroke of the on-coming friction element is complete, a shallow increasing pressure ramp, seen at 207 in FIG. 6b, is applied to the on-coming friction element. By processing transmission input and output speed using a suitable control method, which may include a Kalman filter using a low pass and unfiltered derivatives-based approach, the deceleration caused by the start of the on-coming capacity resulting from the pressure ramp 207 can be detected and the sequence can proceed to the next step beginning at time t1 in FIG. 6b. Reference may be made to U.S. patent application Ser. No. 10/710,530, filed Jul. 19, 2004 for a detailed description of this control method using a Kalman filter and low pass and unfiltered derivatives-based approach. That application is assigned to the assignee of the present invention and is incorporated in this disclosure by reference.

The current automatic transmission input torque is captured at time t1, as seen in FIG. 6d. The input torque necessary to maintain an equivalent output torque in the destination gear is calculated as $T_i(2)=R1 \times T_i(1) \div R2$. A delta torque $dTt_i=T_i(2)-T_i(1)$ is then calculated. The on-coming friction element pressure command then is increased, as shown at 211 in FIG. 6b, in a linear fashion from its value at the end of ramp 207 by a delta value equal to $dT_i \times K_g$, where $K_g$ is the on-coming clutch gain (PSI÷foot pounds), in the time interval t1-t2. Over the same time interval (t1-t2), the transmission input torque is ramped up linearly, as shown at 209, from its value of $T_i(1)$ to $T_i(2)$, as shown at 214 in FIG. 6d. At time t2, the input torque has increased by exactly the amount required to fill the torque hole ($dT_i$), while concurrently increasing on-coming capacity. This prevents the input speed from changing. During the time interval from t2 to t3, torque transfer is completed by linearly increasing at 215 in FIG. 6b the on-coming pressure command by a delta value equal to (inertia_torque×$K_g$), while the off-going pressure command is decreased in a linear fashion, as shown at 217 in FIG. 6c, so that it has no significant capacity. As soon as the speed ratio change is detected at time t3, conventional closed-loop control of the ratio change may proceed with the on-coming friction element, as shown at 119, with possible torque modulation requests being applied to the input torque source (e.g., the engine), as shown at 223 in FIG. 6d. The off-going element should be kept at its stroke value 221 in FIG. 6c in the event of a change of mind. After the speed change is completed, the on-coming capacity is increased to hold the current combustion torque, as shown at 225. This sequencing allows adapting the estimated stroke pressure of the on-coming friction element, as shown 203 in FIG. 6b, by measuring the duration of the shallow ramp 207.

Although a particular sequencing is illustrated in FIGS. 6a, 6b, 6c and 6d, variations in the sequencing may employ the strategy of the present invention. Variations in the sequencing can be derived to satisfy the design requirements of a particular application. Examples of such variations are illustrated, for example, in the plot of FIG. 7, which illustrates the effect of changes in the level of the on-coming friction element torque.

Figure 7:
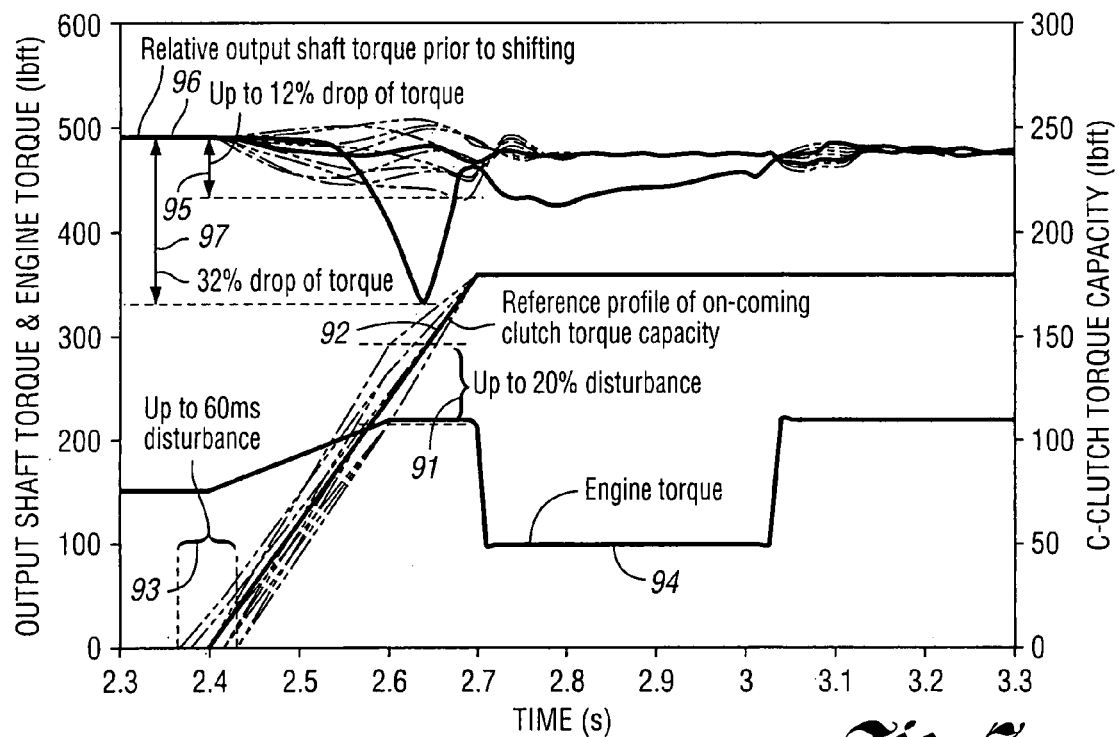
FIG. 7 is a time plot that demonstrates the robustness of the synchronous upshift control of the invention.

FIG. 7 demonstrates the robustness of the control method of the invention applied to a synchronous upshift event. The level of the on-coming friction element torque is disturbed up to 20%, as shown at 91 in FIG. 7 relative to a reference profile shown at 92 during the preparatory phase. This has the result of changing the effect of the magnitude of the torque hole shown in FIG. 7. The initial timing of the on-coming friction element actuation is varied up to 60 ms, as shown at 93 in FIG. 7. The engine torque profile, shown at 94, is identical in all of the variations shown in FIG. 7. According to the strategy of the present invention, the deviations of the output shaft torque are less than 12%, as shown at 95 in FIG. 7, relative to the reference torque level prior to the shift, which is shown at 96. This demonstrates the robustness of the control method of the invention, notwithstanding the presence of control uncertainties. On the other hand, output shaft torque drops up to 32%, as shown at 97, according to the example of a conventional synchronous shift control method illustrated in FIG. 3.

Figure 7A:
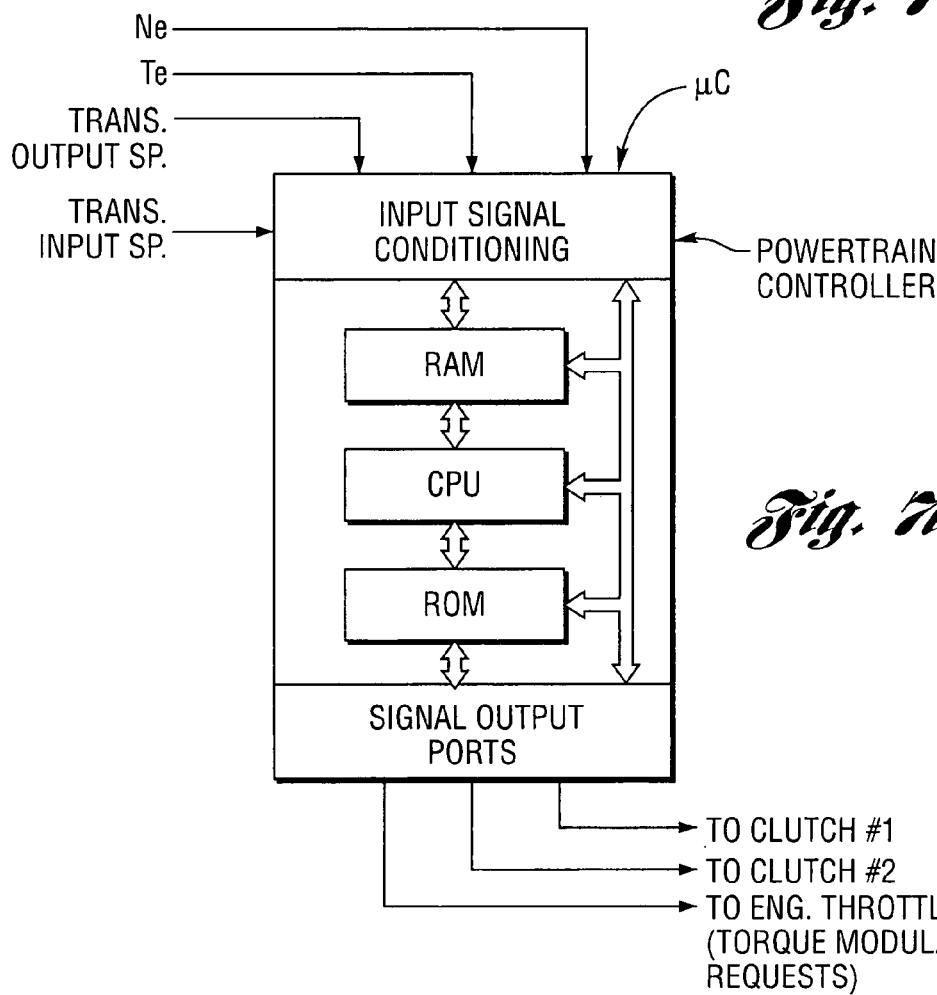
FIG. 7a is a schematic diagram of a microcomputer used as a powertrain controller.

FIG. 7a is a schematic drawing of a well known electronic microprocessor controller that would be used in a powertrain that embodies the invention. It includes a RAM memory that receives input signals, including an engine speed (Ne), an engine throttle or torque signal (Te), and transmission input and output speeds. These signals are conditioned and stored in RAM, where they are located and used by a central processor unit (CPU) in execution of appropriate algorithms stored in ROM memory, including pressure command functions, speed functions, and torque functions herein described. Appropriate signals are distributed by the CPU through output ports to the clutches (torque establishing elements) 36 and 38 in FIGS. 1 and 1a and at 222 in FIGS. 8a and 8b.

FIGS. 8a and 8b schematically illustrate a non-synchronous multiple ratio planetary gear system. The transmission is shown in low gear configuration in FIG. 8a, and in high gear configuration in FIG. 8b. Torque is delivered from engine 200 to a hydrokinetic torque converter 202. Turbine torque from the torque converter is delivered to sun gear 204 of a first planetary gear set 206. The ring gear 208 of the planetary gear set 206 is driveably connected to the carrier 210 of a second planetary gear set 212. The pinion carrier 214 of gear set 206 is driveably connected to ring gear 216 of gear set 212. Ring gear 216 is connected driveably to power output shaft 218. The carrier 210 is braked in the configuration of FIG. 8a to a stationary element of the transmission by one-way coupling or overrunning coupling 220. To effect an upshift from the low gear configuration to an upshifted higher gear configuration, clutch 222 is engaged. This connects sun gear 224 to a stationary element of the transmission so that the sun gear 224 acts has a reaction element. The carrier 210 no longer acts as a reaction element since overrunning coupling 220 at this time is overrunning.

The non-synchronous gearing arrangement of FIGS. 8a and 8b, as in the case of the synchronous gearing arrangement of FIGS. 1 and 1a, is an example of multiple ratio planetary gear transmissions that would be capable of embodying the present invention.

In the non-synchronous automatic transmission system of FIGS. 8a and 8b, the clutching component, which may be the overrunning coupling 220 associated with a low gear configuration, automatically losses its torque and disengages during an upshift, while a friction element, in this case, clutch 222 associated with high gear configuration, develops engagement torque. In this instance, the clutch 222 is referred to as the on-coming clutch.

In FIGS. 8a and 8b, as in the case of FIGS. 1 and 1a, the torque flow paths designated by heavy directional lines represent the primary torque flow path.

Figure 9:
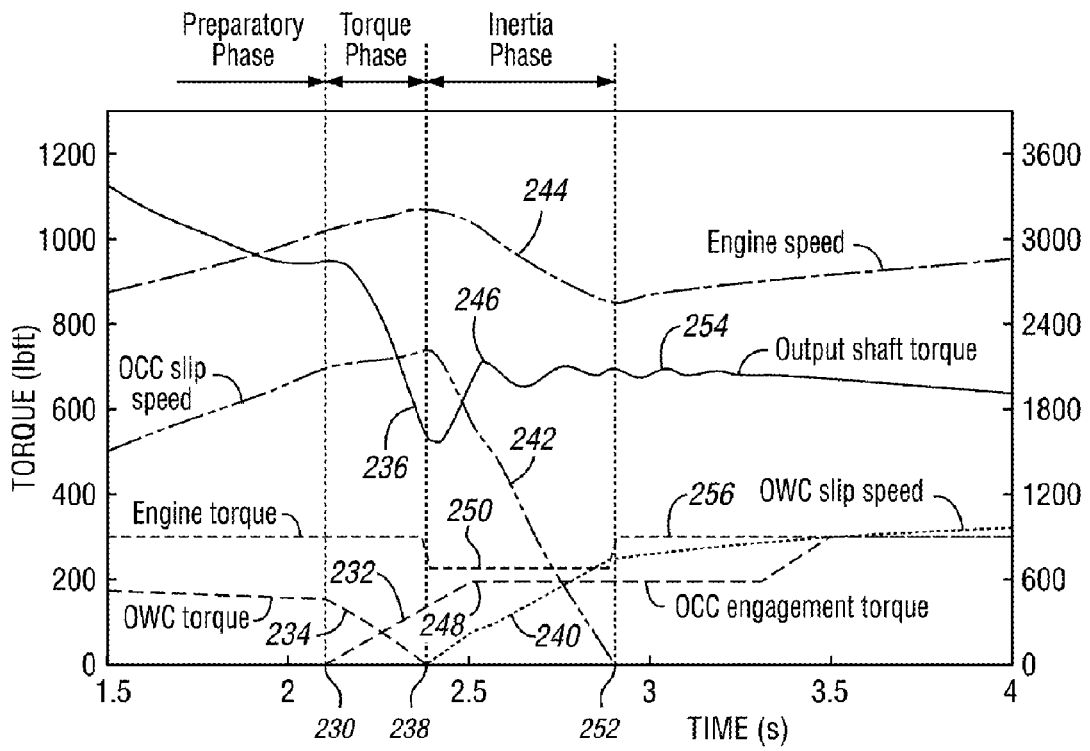
FIG. 9 is a time plot of a non-synchronous upshift control method.

FIG. 9 shows a non-synchronous upshift behavior pattern from low gear configuration to high gear configuration under a constant engine throttle setting according to a conventional non-synchronous upshift control method. Vehicle speed, in the case of the transmission of FIG. 9, can be considered approximately constant during the shift because of its short duration. Again, the shift is divided into three phases; i.e., the preparatory phase, the torque phase, and the inertia phase. The torque phase for the non-synchronous shift is defined as a time period when the on-coming clutch torque is purposely raised for its engagement until the one-way coupling start overrunning. This definition differs from that for the synchronous shift because the non-synchronous shift does not involve active control of off-going clutch or overrunning coupling. The preparatory phase for the non-synchronous upshift is defined as a time period prior to the torque phase. The inertia phase for the non-synchronous upshift is defined as a time period when the one-way coupling starts to overrun, following the torque phase. During the preparatory phase, the on-coming clutch actuator piston is stroked to prepare for its engagement (this is not shown in FIG. 9). The torque phase begins when the on-coming clutch engagement torque starts rising, as shown at 230 in FIG. 9. An increasing on-coming clutch engagement torque, shown at 232, alters a torque balance of the planetary gear sets, thereby causing torque transmitted through the overrunning coupling to decrease, as shown at 234. During the torque phase, the overrunning coupling 220 remains engaged without overrunning, which maintains the planetary gear set in the low gear configuration. Increasing the on-coming clutch engagement torque at 232, however, effectively reduces the net torque output from the gear sets. Thus, the output shaft torque drops significantly during the torque phase, creating the so-called torque hole at 236. As previously indicated, the large torque hole is perceived by the vehicle occupant as an unpleasant shift shock.

The torque phase ends and the inertia phase begins when the overrunning coupling 220 begins to overrun, as indicated at 238 in FIG. 9. During the inertia phase, the overrunning coupling no longer transmits significant torque. The overrunning coupling slip speed rises, as shown at 240, while the on-coming clutch slip speed decreases toward zero, as shown at 242. The engine speed drops, as shown at 244, as the planetary gear configuration changes. During the inertia phase, the output shaft torque is primarily affected by the on-coming clutch engagement torque. This causes the output torque to rapidly move to level 246, which corresponds to the on-coming clutch engagement torque 248. Under certain conditions, this may lead to a large torque oscillation during the inertia phase that can be perceptible to a vehicle occupant, as described later through FIG. 12.

FIG. 9 shows reduced engine torque at 250 during the inertia phase. This is due to engine torque truncation by means of engine spark timing control, which, as mentioned previously, is common practice in a conventional shift control system. Reduced engine torque during the inertia phase enables the on-coming clutch to complete its engagement within a target time without requiring excessive engagement torque level. When the on-coming clutch completes its engagement, or when its slip speed becomes zero, as shown at 252, the shift event is completed. The engine torque truncation is removed and the output shaft torque moves to the level 254, which corresponds to a given engine torque level 256.

Figure 10:
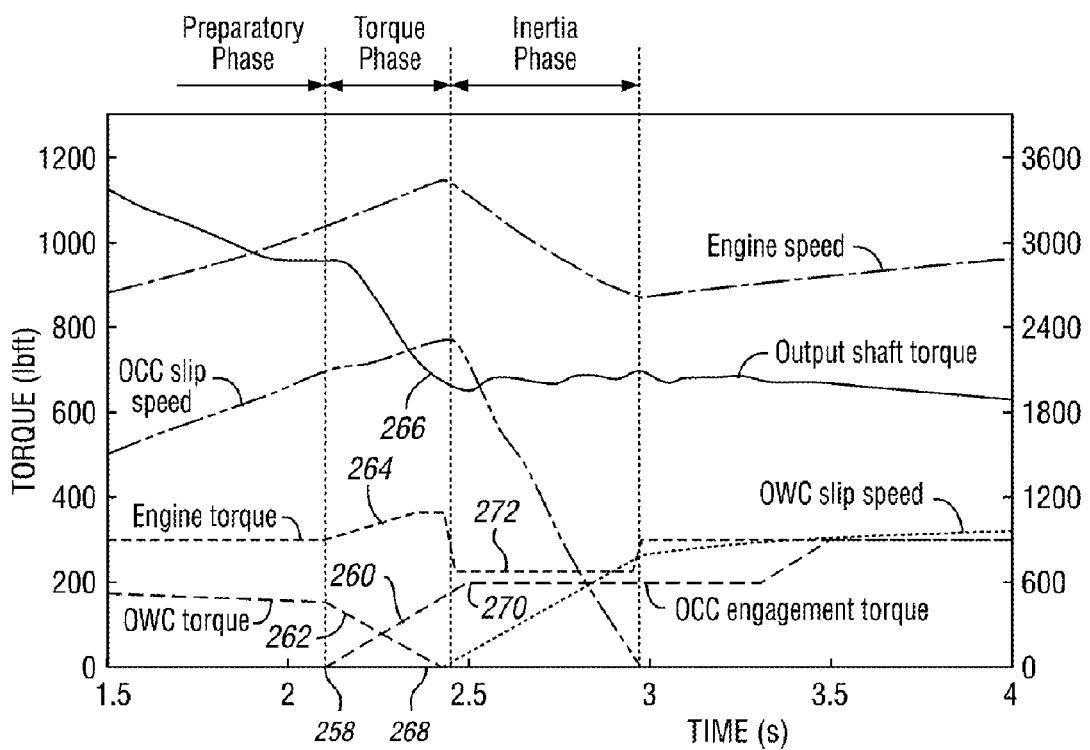
FIG. 10 is a time plot of the non-synchronous upshift control of the invention.

FIG. 10, in contrast to the conventional characteristics shown in FIG. 9, shows the non-synchronous upshift control method for a powertrain with electronic engine throttle control in accordance with the present invention. During the preparatory phase, the on-coming clutch actuator piston is stroked to prepare for its engagement (this is not shown in FIG. 10). The torque phase begins when the on-coming clutch engagement torque starts rising, as shown at 258. Increasing on-coming clutch engagement torque, as shown at 260, alters a torque balance of the planetary gear sets thereby causing torque transmitted through the overrunning coupling to decrease, as shown at 262.

In order to prevent output shaft torque from dropping further, engine torque (input torque into the transmission) is increased using electronic throttle control, as shown at 264 in FIG. 10. When this increased engine torque is balanced with on-coming clutch engagement torque, the output shaft torque exhibits no significant torque hole, as indicated at 266. Specifically, an algebraic expression can readily be derived to approximately describe a relationship between engine torque, output shaft torque and on-coming clutch engagement torque during the torque phase, assuming that acceleration or deceleration of components can be neglected. This algebraic expression is generally expressed as: output shaft torque=function (engine torque, on-coming clutch torque). For a given target output shaft torque during the torque phase, this equation can be used to set an initial target for engine torque profile and on-coming clutch engagement torque profile. Then, engine torque and on-coming clutch engagement torque are controlled based on an open-loop approach without requiring output shaft torque measurements in such a way that an unexpected deviation and speed signals is adaptively corrected from one shift event to another based on speed measurements, including engine speed and transmission input and output shaft speeds. No spark timing control is required during the torque phase.

When the overrunning coupling starts to overrun or begins to slip, as shown at 268, the torque phase ends and the inertia phase begins. The on-coming clutch engagement torque may be increased to a higher level 270 if higher output shaft torque is desired during the inertia phase. During the inertia phase, a conventional shift control strategy may apply, including a conventional engine torque truncation, as shown at 272 and a conventional closed-loop control of on-coming clutch engagement based on transmission input and output speeds. In addition, the engine throttle position may be adjusted (not shown in FIG. 10) to a level that corresponds to a desired output shaft torque level after the shift event.

The shift control method of the invention, applied to a non-synchronous upshift, requires engine torque to increase using electronic throttle control during the torque phase, as shown at 264. Alternatively, an auxiliary device, such as an electric motor, can be used to supplement engine torque during the torque phase, as in the case of a hybrid electric vehicle powertrain.

Figure 11:
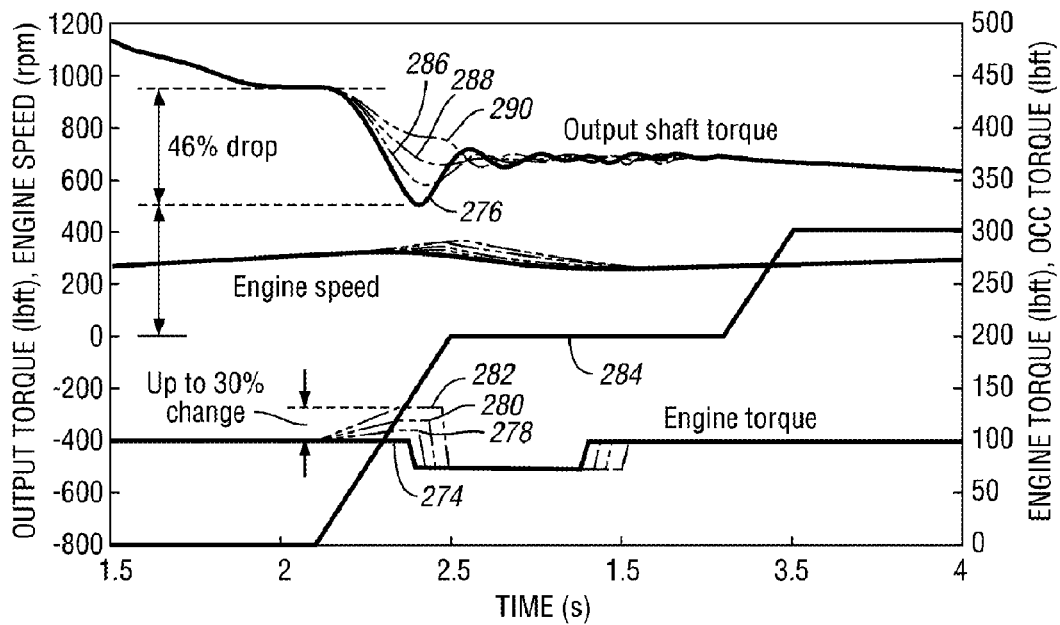
FIG. 11 shows time plots of a non-synchronous upshift control of the invention with various alternate output shaft torque profiles for various engine torque input values.

FIG. 11 shows alternative embodiments of the control strategy of the invention applied to a non-synchronous upshift. It also illustrates the robustness of the strategy of the invention to accommodate control uncertainties. In FIG. 11, a conventional method defines a baseline behavior for comparison purposes. A baseline engine torque 274 remains constant during the torque phase, and the corresponding output torque at 276 drops as much as 46%. This value is roughly due to the difference in speed ratios for the low and high gear configurations of FIGS. 8a and 8b. As alternative embodiments of the strategy of the invention, engine torque can be raised by 10%, as shown at 278, 20% as shown at 280, and 30% as shown at 282 over the baseline value 274 during the torque phase while maintaining the identical on-coming clutch engagement torque profile shown at 284. The depth of the torque hole progressively becomes more shallow, as shown at 286, 288 and 290 as the engine torque increases, as previously described, during the torque phase. Thus, in a practical application of the invention, a target engine torque profile during the torque phase and the corresponding on-coming clutch torque profile can be adjusted in more than one way to realize a desired level of torque hole reduction for improved shift quality. This, in turn, implies that the control characteristics of the invention are robust under the presence of control uncertainties. That is, it is not necessary to uniquely match engine torque and on-coming clutch engagement torque in order to benefit from a reduced torque hole.

Figure 12:
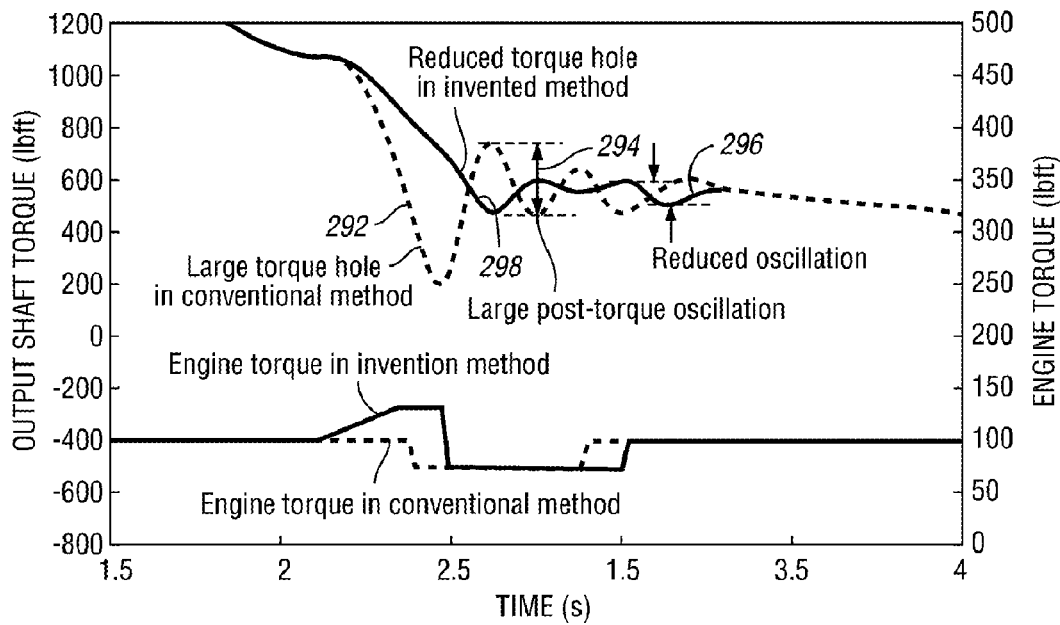
FIG. 12 is a time plot of output shaft torque oscillations for both a conventional non-synchronous transmission control and the non-synchronous transmission control of the present invention.

FIG. 12 shows the benefits of the invention for a powertrain system with small torsional damping characteristics during a non-synchronous upshift. In a conventional upshift control method, a large torque hole, shown at 292, can induce large output shaft torque oscillation, as shown at 294, during the inertia phase. The large torque oscillation can be perceived, as explained previously, as an unpleasant shift shock by a vehicle occupant. The control method of the invention significantly reduces the torque oscillation shown at 296 during the inertia phase by suppressing torque hole shown at 298 that triggers the oscillation. The same benefits of the invention are also realized in a powertrain system with poor damping characteristics during a synchronous upshift.

The method of the invention requires an increased torque level at the input side of the transmission prior to the inertia phase of upshifting. With a combustion-based engine system, the method of the invention is limited to operation below wide open throttle condition where engine torque increase is permitted using electronic throttle control. For a powertrain with an electric motor system, such as a hybrid electric vehicle powertrain, the present invention can be applied to cases in which wide open throttle conditions exist.

The method of the present invention in non-synchronous shift applications raises engine torque during the torque phase through engine throttle control, unlike the prior art system of the previously mentioned U.S. Pat. No. 4,724,723 which employs spark timing control during both preparatory phase and torque phase. The effects of increased engine torque is mitigated by means of increased on-coming clutch torque.

FIGS. 13a, 13b, 13c, and 13d show the entire shift control sequence for a non-synchronous transmission using the control method of the invention. Initially, the on-coming clutch must be staged during the preparatory phase. As soon as an automatic upshift from speed ratio R1 to R2 is commanded at 300, the on-coming clutch pressure command is raised to an elevated level, as shown at 302 in FIG. 13b, to speed clutch filling. The on-coming clutch pressure then is reduced to approximately its stroke pressure at 304. The on-coming clutch thus fills and completes its stroke without gaining any significant torque capacity. After the stroke of the on-coming clutch is complete, a shallow increasing ramp 306 is applied to the on-coming clutch pressure to slightly raise the on-coming clutch torque capacity. By processing transmission input speed and output speed using a suitable method with a Kalman filter, low pass and unfiltered derivatives-based approach described in previously mentioned co-pending patent application Ser. No. 10/710,530, filed Jul. 19, 2004, the deceleration of the rotating components of the transmission caused by slightly raised on-coming clutch torque capacity can be detected. Then, the sequence proceeds to the next step of the torque phase beginning at time t1.

The current transmission input torque is captured as $T_i(1)$, as shown in FIG. 13d. The input torque necessary to maintain an equivalent output torque in the destination gear is calculated as $T_i(2)=R1\times T_i(1)\div R2$. A delta torque $dT_i=Kf\times[T_i(2)-T_i(1)]$ is then calculated, where Kf is a calibratable parameter specifying the fraction of torque fill desired. The on-coming clutch pressure command then is increased, as shown at 312 in FIG. 13b in an open-loop fashion from its value at the end of ramp 306 by a delta value equal to $K_g\times dT_i$ during the time interval between t1 and t2, where $K_g$ is the on-coming clutch gain expressed as PSI÷foot pounds. Over the same time interval between t1 and t2, the transmission input torque is also increased in an open-loop fashion, as shown at 314 in FIG. 13d, from its value of $T_i(1)$ to $T_i(1)+dT_i$ as shown at 316 in FIG. 13d, through the use of electronic throttle control or by means of an electric motor, as in the case of a hybrid electric vehicle powertrain.

At time t2, the input torque is increased by $dT_i$ and is held at that elevated level while the correctly matched on-coming clutch torque capacity prevents the input and output speeds from abruptly changing. The off-going clutch element, which is the overrunning coupling in this instance, remains engaged without overrunning. During the time interval from t2 to t3, a torque transfer is completed by increasing on-coming clutch pressure command by a delta value equal to $K_g \times$ inertia torque, as shown at 318 in FIG. 13*b*. At some point between time t2 and time t3, the overrunning coupling begins slipping, as shown at 320 in FIG. 13*c*, so it no longer transmits any significant torque.

As soon as the speed ratio change is detected at time t3, the torque phase ends and the inertia phase begins. During the inertia phase, a conventional closed-loop shift control may apply to on-coming clutch engagement, as shown at 322 in FIG. 13*b*, with possible torque modulation requests applied to the input torque source (e.g., engine), as shown at 324 seen in FIG. 13*d*. After the speed change is completed, the transmission input torque may be restored to the desired post-shift torque level. Post-shift torque level 326 is seen in FIG. 13*d*, which may range from $T_i(1)$ to $T_i(2)$. Accordingly, on-coming clutch torque capacity is increased as shown at 328 in FIG. 13*d* to securely hold its engagement under the current input torque, as shown at 326. This sequencing of FIGS. 13*a*-13*d* allows adapting the estimated on-coming clutch stroke pressure at 304 by measuring the duration of the shallow ramp 306. In addition, an adaptation of coordinated pressure and torque increase at 312 and 314, respectively, can be accomplished by detecting early or late speed ratio changes and altering the pressure or torque increases appropriately. Variations in the torque values and in the on-coming pressure values can be accommodated within the scope of the method illustrated in FIGS. 13*a*-13*d*.

Although embodiments of the invention have been particularly described, it will be apparent to persons skilled in the art that modifications may be made without departing from the scope of the invention. All such modifications and equivalents thereof are intended to be covered by the following claims.

What is claimed is:

1. A synchronous gear ratio shift control for a multiple-ratio automatic transmission in a powertrain for an automotive vehicle, the transmission including gearing defining multiple torque flow paths from a transmission input torque source to a transmission torque output member and first and second torque establishing elements for selectively establishing, respectively, a gear configuration with a low speed ratio and a gear configuration with a higher speed ratio during a ratio upshift event;

a synchronous ratio upshift event being characterized by a preparatory phase followed by a torque phase;

means for maintaining torque capacity of the first torque establishing element against slippage during the preparatory phase and releasing torque capacity of the first torque establishing element during the torque phase;

means for increasing torque capacity of the second torque establishing element during the preparatory phase and the torque phase;

the torque phase being followed by an inertia phase;

means for increasing transmission input torque prior to the inertia phase; and means for reducing transmission input torque during the inertia phase;

the synchronous ratio upshift event being completed following the inertia phase by restoring torque from the torque source;

torque capacity of the second torque establishing element being increased at a first rate during the preparatory phase and at a second rate during the torque phase as the torque capacity of the first torque establishing element is decreased during the torque phase until the first torque establishing element begins to slip.

2. A synchronous gear ratio shift control for a multiple-ratio automatic transmission in a powertrain for an automotive vehicle, the transmission including gearing defining multiple torque flow paths from a transmission input torque source to a transmission torque output member and first and second pressure actuated torque establishing elements for selectively establishing, respectively, a gear configuration with a low speed ratio and a second gear configuration with a higher speed ratio during a synchronous ratio upshift event;

a synchronous ratio upshift event being characterized by a preparatory phase followed by a torque phase;

the first and the second torque establishing elements being independently, but synchronously, controlled during the torque phase whereby the upshift event is synchronous;

means for maintaining torque capacity of the first torque establishing element against slippage during the preparatory phase and releasing torque capacity of the first torque establishing element during the torque phase;

means for increasing torque capacity of the second torque establishing element during the preparatory phase and the torque phase;

means for increasing transmission input torque during the preparatory phase;

the torque phase being followed by an inertia phase; and means for reducing transmission input torque from the torque source during the inertia phase;

the synchronous ratio upshift event being completed following the inertia phase by restoring torque from the torque source;

torque capacity of the second torque establishing element being increased at a first rate during the preparatory phase and at a second rate during the torque phase as the torque capacity of the first torque establishing element is decreased during the torque phase until the first torque establishing element begins to slip.

3. A synchronous gear ratio shift control as set forth in claim 2 wherein the torque capacity of the first torque establishing element is released during a portion of the preparatory phase while maintaining engagement of the first torque establishing element prior to a further release of torque capacity of the first torque establishing element during the torque phase.

4. A method for controlling synchronous gear ratio shifts in a multiple-ratio automatic transmission for an automotive vehicle powertrain, the automatic transmission including gearing defining multiple torque flow paths from a transmission input torque source to a transmission torque output member and first and second pressure actuated torque establishing elements for establishing, respectively, a gear configuration with a low speed ratio and a gear configuration with a higher speed ratio during a synchronous ratio upshift event, a synchronous ratio upshift event being characterized by a preparatory phase, a torque phase and an inertia phase, the method comprising the steps of:

maintaining torque capacity of the first torque establishing element against slippage during the preparatory phase;

decreasing torque capacity of the first torque establishing element during the torque phase;

increasing torque capacity of the second torque establishing element during the preparatory phase and the torque phase;

increasing transmission input torque during the preparatory phase; and means for reducing transmission input torque from the torque source during the inertia phase; and increasing torque capacity of the second torque establishing element at a first rate during the preparatory phase and at a second rate during the torque phase as the torque capacity of the first torque establishing element is decreased during the torque phase until the first torque establishing element begins to slip.

5. The method set forth in claim 4 including the step of restoring torque from the torque source following completion of the synchronous ratio upshift event at the end of the inertia phase.

6. The method set forth in claim 4 including the step of reducing torque capacity of the first torque establishing element during a portion of the preparatory phase while maintaining engagement of the first torque establishing element prior to a further release of torque capacity of the first torque establishing element during the torque phase.

7. A gear ratio shift control for a multiple-ratio automatic transmission in a powertrain for an automotive vehicle, the transmission including gearing defining multiple torque flow paths from a transmission input torque source to a transmission torque output member and first and second torque establishing elements for selectively establishing, respectively, a gear configuration with a low speed ratio and a gear configuration with a higher speed ratio during a ratio upshift event;

a ratio upshift event being characterized by a preparatory phase followed by a torque phase;

means for maintaining torque capacity of the first torque establishing element against slippage during the preparatory phase and releasing torque capacity of the first torque establishing element during the torque phase;

means for increasing torque capacity of the second torque establishing element during the preparatory phase and the torque phase;

the torque phase being followed by an inertia phase;

means for increasing transmission input torque prior to the inertia phase;

means for reducing transmission input torque during the inertia phase; and the torque capacity of the second torque establishing element being increased at a first rate during the preparatory phase and at a second rate during the torque phase as the torque capacity of the first torque establishing element is decreased during the torque phase until the first torque establishing element begins to slip.

8. A synchronous gear ratio shift control for a multiple-ratio automatic transmission in a powertrain for an automotive vehicle, the transmission including gearing defining multiple torque flow paths from a transmission input torque source to a transmission torque output member and first and second pressure actuated torque establishing elements for selectively establishing, respectively, a gear configuration with a low speed ratio and a second gear configuration with a higher speed ratio during a synchronous ratio upshift event;

a ratio upshift event being characterized by a preparatory phase followed by a torque phase;

the first and the second torque establishing elements being independently, but synchronously, controlled during the torque phase whereby the upshift event is synchronous;

means for maintaining torque capacity of the first torque establishing element against slippage during the preparatory phase and releasing torque capacity of the first torque establishing element during the torque phase;

means for increasing torque capacity of the second torque establishing element during the preparatory phase and the torque phase;

means for increasing transmission input torque during the preparatory phase;

the torque phase being followed by an inertia phase;

means for reducing transmission input torque from the torque source during the inertia phase; and the torque capacity of the second torque establishing element being increased at a first rate during the preparatory phase and at a second rate during the torque phase as the torque capacity of the first torque establishing element is decreased during the torque phase until the first torque establishing element begins to slip.

9. The synchronous gear ratio shift control as set forth in claim 8 wherein the synchronous ratio upshift event is completed following the inertia phase by restoring torque from the torque source.

10. A synchronous gear ratio shift control as set forth in claim 8 wherein the torque capacity of the first torque establishing element is released during a portion of the preparatory phase while maintaining engagement of the first torque establishing element prior to a further release of torque capacity of the first torque establishing element during the torque phase.

11. A method for controlling synchronous gear ratio shifts in a multiple-ratio automatic transmission for an automotive vehicle powertrain, the automatic transmission including gearing defining multiple torque flow paths from a transmission input torque source to a transmission torque output member and first and second pressure actuated torque establishing elements for establishing, respectively, a first gear configuration with a low speed ratio and a second gear configuration with a higher speed ratio during a synchronous ratio upshift event, a synchronous ratio upshift event being characterized by a preparatory phase, a torque phase and an inertia phase, the method comprising the steps of:

maintaining torque capacity of the first torque establishing element against slippage during the preparatory phase;

decreasing torque capacity of the first torque establishing element during the torque phase;

increasing torque capacity of the second torque establishing element during the preparatory phase and the torque phase;

increasing transmission input torque during the preparatory phase;

means for reducing transmission torque from the torque source during the inertia phase; and the torque capacity of the second torque establishing element being increased at a first rate during the preparatory phase and at a second rate during the torque phase as the torque capacity of the first torque establishing element is decreased during the torque phase until the first torque establishing element begins to slip.

12. The method set forth in claim 11 including the step of restoring torque from the torque source following completion of the synchronous ratio upshift event at the end of the inertia phase.

13. The method set forth in claim 11 including the step of reducing torque capacity of the first torque establishing element during a portion of the preparatory phase while maintaining engagement of the first torque establishing element prior to a further release of torque capacity of the first torque establishing element during the torque phase.

* * * * *